July 24, 1956  E. T. DUNNINGTON  2,755,828
CHAIN SAW
Filed Aug. 3, 1951
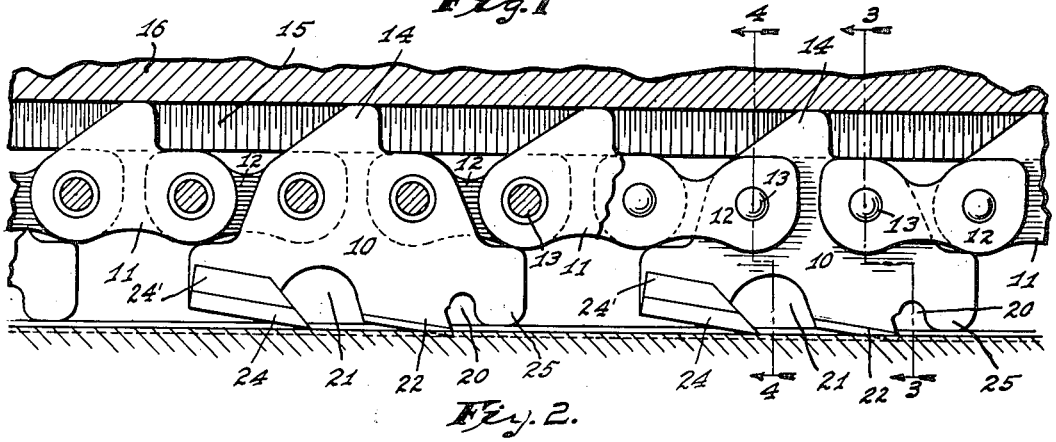
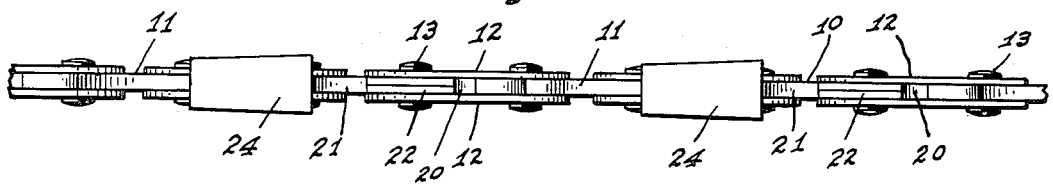
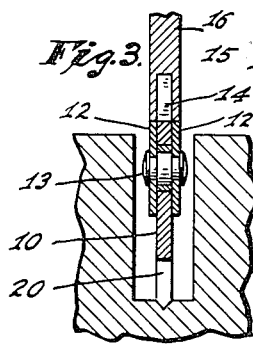 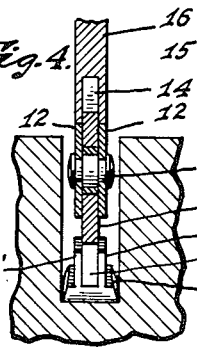 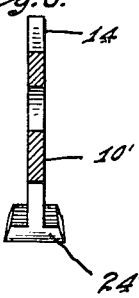 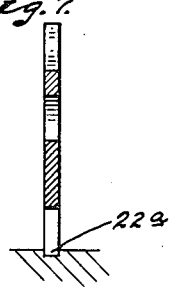
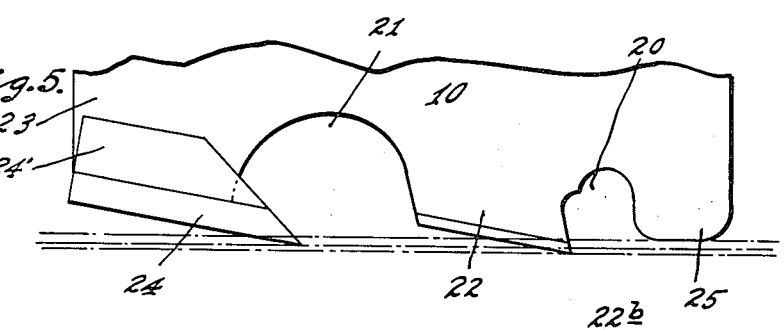
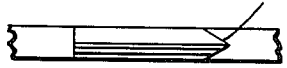
INVENTOR.
EDWIN T. DUNNINGTON,
BY
ATTORNEYS.

United States Patent Office 2,755,828
Patented July 24, 1956

2,755,828

CHAIN SAW

Edwin T. Dunnington, Indianapolis, Ind.

Application August 3, 1951, Serial No. 240,189

3 Claims. (Cl. 143—135)

This invention relates to chain saws and has for its object the production of a chain saw of simple and economical construction which will produce chips that readily free themselves from the saw and lessen the possibilities of jamming.

In practicing the invention I incorporate in the saw two different forms of teeth arranged in pairs with each pair including a tooth of each type. The leading tooth in each pair is a relatively narrow grooving or slitting tooth located in the median plane of the saw, while the trailing tooth is a router tooth adapted to remove independent chips on opposite sides of the groove or slit cut by the grooving tooth. In the preferred form of construction, each pair of teeth is embodied in a single tooth-bearing chain-plate.

The accompanying drawing illustrates the invention: Fig. 1 is a side elevation, in partial section, and Fig. 2 a bottom plan view, of a portion of a chain saw; Figs. 3 and 4 are transverse vertical sections respectively on the lines 3—3 and 4—4 of Fig. 1; Fig. 5 is a fragmental view similar to Fig. 1 but on an enlarged scale; Figs. 6 and 7 are views similar to Figs. 3 and 4 illustrating modified tooth-forms; and Fig. 8 is a fragmental view similar to Fig. 2 illustrating a further modification.

The saw shown in the drawing comprises a series of teeth-bearing plates 10 interconnected by groups of chain-links. Each group of such links comprises an intermediate link 11 coplanar with the plates 10 and end links each comprising a pair of side plates 12 which lap the intermediate link and the tooth-bearing plates 10. Transverse pins 13 pivotally interconnect the links with each other and with the tooth-plates 10. Each tooth-plate and each intermediate link 11 has a projecting tongue 14 slidably received in a groove 15 extending along the edge of a cutter bar 16 constituting a part of the frame of the complete saw.

In practicing my invention in its preferred form, I provide each chain-plate 10 with a pair of gullets 20 and 21 defining between them a grooving or slitting tooth 22. The rearmost gullet 21 is spaced from the rear end of the plate 10 to leave a tongue 23 which, in the construction illustrated in Figs. 1 to 5, provides a mounting for a router tooth 24. As will be clear from Fig. 4, each router tooth is formed as a separate element and is provided with laterally spaced ears 24' which receive the tongue 23 between them to locate the tooth 24 laterally of the plate 10. Each tooth 24 is conveniently held in place on its associated tongue 23 by brazing, although other means of attachment may be employed if desired. That portion 25 of each plate 10 which lies ahead of the gullet 20 constitutes a stop which, by bearing on the bottom of the saw-kerf, limits the depth of cut.

The leading tooth 22 is formed, and the trailing tooth 24 is disposed, to provide back clearance, as will be clear from Fig. 1 and 5. In addition, the leading end of the tooth 22 projects outwardly beyond the cutting edge of the tooth 24. The tooth 22 may be shaped as indicated in Fig. 3, to cut a V-groove, as indicated at 22a in Fig. 7 to cut a rectangular groove, or as indicated at 22b in Fig. 8 to slit the wood without the removal of any chip. In the latter instance, the leading portion of the tooth 22 is beveled on both sides, as indicated in Fig. 8, to produce a knife-like leading edge lying substantially in the median plane of the chain.

In the particular construction shown, the width of the routing tooth 24 determines the width of the kerf cut by the saw, and the teeth 24, therefore, must be wide enough to permit the headed ends of the chain pins 13 to enter the kerf with the necessary clearance for smooth operation. It is to be understood, however, that my invention is applicable to chain saws in which the width of the kerf is determined by laterally offset slotting teeth and the router tooth removes the wood between the spaced slots cut by such slotting teeth.

It will be understood that the chain is endless and will be driven by any suitable means to cause its operative stretch to run along the cutter bar 16 from left to right, as indicated by the arrow in Fig. 1. The leading teeth 22, which are disposed in the median plane of the saw, serve to cut a groove or slit along the bottom of the saw-kerf at the center thereof, as will be clear from Fig. 3. As each such tooth projects outwardly beyond the router tooth 24 trailing it, such router-tooth removes two independent chips, one from each side of the groove or slit left by the immediately preceding grooving or slitting tooth 22. Such chips, being comparatively narrow, clear readily with much less tendency to jam than exists in the case of wider chips removed by router teeth which cut across the median plane of the saw. Further, since each router tooth in a saw embodying my invention removes two chips of substantially equal width which clear through the spaces on opposite sides of the chain, any lateral pressures resulting from the presence of chips within the kerf are eeffctively balanced. The router teeth of prior chain saws of which I am aware cut across the median plane of the saw and remove a chip having portions lying on opposite sides of that plane so that it is necessary to deflect each chip laterally of the saw. In order that the lateral deflection of such chips will not produce a resultant force tending to move the saw as a whole laterally of the kerf, it is necessary that not all the router teeth deflect the chips in the same lateral direction. It has therefore been a common practice to incorporate in the chain two different forms of tooth-bearing plates, one bearing a router tooth which deflects its chips to the right and the other bearing a router tooth which deflects its chips to the left, plates of the two types alternating on the chain. Such an arrangement has the disadvantage that it requires two forms of router-tooth plates, thus increasing manufacturing cost and complicating the operation of chain assembly. Further, in such a chain the reaction of the chip and uncut wood on the tooth has a substantial lateral component which must be transmitted through the chain to adjacent tooth-bearing plates, thus introducing twisting forces into the chain, localizing bearing pressures on the chain pins, accelerating wear, and, as lost motion develops and the teeth dull, causing such relative lateral displacement of adjacent tooth-bearing plates that the width of the kerf will be unduly reduced. In a chain saw made in accordance with my invention, all tooth-bearing plates may be of the same construction, thus reducing cost and simplifying assembly problems, and as the resultant wood and chip reaction on each plate lies in the plane thereof, no twisting forces are introduced into the chain.

Instead of forming the tooth 24 as a separate element secured to the chain-plate 10, I may employ the construction illustrated in Fig. 6 in which the router tooth 24' is integral with the chain-plate 10'. I prefer, however, to form the router teeth separately and secure them to the plate, as such an arrangement eliminates the necessity for a forging operation.

I claim as my invention:

1. In a chain saw, a series of tooth bearing plates and means interconnecting them to form a chain, each of said plates comprising a leading tooth and a trailing tooth, said leading tooth being located in the median plane of the chain and being relatively narrow to cut into the bottom of the saw-kerf substantially along the center-line thereof and being adapted as it is drawn through the material being sawn to slit such material without the removal of a chip, said leading tooth projecting beyond said trailing tooth in the direction of feed to an extent at least equal to the depth of cut of the trailing tooth, said trailing tooth being a router tooth having a relatively long cutting edge extending transversely of the chain through the median plane thereof to remove independent chips from opposite sides of the central cut made by the immediately preceding leading tooth, the cutting edge of said router tooth having transversely of the chain an extent materially greater than the maximum thickness of said plates, whereby it will cut a kerf wide enough to provide between the kerf-walls and the plates spaces on opposite sides of the chain affording free passage of said independent chips out of the kerf.

2. In a chain saw, an endless series of router teeth having cutting edges extending through the median plane of the saw to cut the bottom of the saw kerf, said saw having ahead of each router tooth a slitting tooth materially narrower than the router tooth and located substantially in the median plane of the saw to cut into the bottom of the saw kerf, said narrower tooth projecting beyond said router tooth in the direction of feed to an extent at least equal to the depth of cut of the router tooth, whereby the router tooth will remove two independent chips from opposite sides of the cut formed by the narrow tooth, the extent of the cutting edge of each router tooth transversely of the chain saw being materially greater than the transverse extent of other portions of the saw whereby to produce a kerf which will provide inwardly of such cutting edges and at opposite sides of the saw spaces affording free passage for said independent chips, said slitting tooth being adapted as it is drawn through the material being sawn to slit such material without the removal of a chip.

3. In a chain saw, an endless series of router teeth each having a cutting edge extending transversely of the saw, said chain having ahead of each router tooth a narrower tooth disposed within the lateral limits of the cutting edge of the router tooth to cut into the bottom of the saw kerf, said narrower tooth projecting beyond said router tooth in the direction of feed to an extent at least equal to the depth of cut of the router tooth, whereby the router tooth will remove two independent chips from opposite sides of the cut formed by the narrow tooth, the extent of the cutting edge of each router tooth transversely of the chain saw being materially greater than the transverse extent of other portions of the saw whereby to produce a kerf which will provide inwardly of such cutting edges and at opposite sides of the saw spaces affording free passage for said independent chips, said narrower tooth being a slitting tooth adapted as it is drawn through the material being sawn to slit such material without the removal of a chip.

References Cited in the file of this patent

UNITED STATES PATENTS

| D. 32,820 | Zwiebel | June 12, 1900 |
| 293,276 | Riley | Feb. 12, 1884 |
| 543,608 | Beale | July 30, 1895 |
| 2,583,243 | Tweedie | Jan. 22, 1952 |

FOREIGN PATENTS

| 4,049 | Great Britain | Feb. 15, 1897 |